United States Patent [19]

Pozzebon et al.

[11] Patent Number: 5,480,287

[45] Date of Patent: Jan. 2, 1996

[54] PUMPING DEVICE, PARTICULARLY FOR SPORTS SHOES, AND METHOD FOR MANUFACTURE THEREOF

[75] Inventors: Adolfo Pozzebon, Sala d'Istrana; Alessandro Pozzobon, Paderno di Ponzano Veneto; Alessandro Morandin, Villorba, all of Italy

[73] Assignee: Nordica S.p.A., Trevignano, Italy

[21] Appl. No.: 228,634

[22] Filed: Apr. 18, 1994

[30] Foreign Application Priority Data

May 4, 1993 [IT] Italy .................. TV93A0048

[51] Int. Cl.⁶ .................................................. F04B 43/02
[52] U.S. Cl. .......................... 417/53; 417/480; 417/437; 36/88; 36/93; 36/114; 29/516
[58] Field of Search ..................... 36/93, 88, 114, 36/71; 29/888, 888.02, 515, 516; 417/53, 479, 480, 434, 440, 437

[56] References Cited

U.S. PATENT DOCUMENTS

| | | | |
|---|---|---|---|
| 1,954,122 | 4/1934 | Fiori | 36/71 |
| 2,638,690 | 5/1953 | Bullard, III | 36/71 |
| 3,664,043 | 5/1972 | Polumbus, Jr. | 36/71 |
| 4,232,459 | 11/1980 | Vaccari | 36/71 |
| 4,995,173 | 2/1991 | Spier | 36/93 |
| 5,074,765 | 12/1991 | Pekar | 417/480 |
| 5,113,599 | 5/1992 | Cohen | 36/88 |
| 5,144,708 | 9/1992 | Pekar | 417/480 |
| 5,158,767 | 10/1992 | Cohen | 36/88 |
| 5,353,525 | 10/1994 | Grim | 36/88 |
| 5,372,487 | 12/1994 | Pekar | 36/93 |

FOREIGN PATENT DOCUMENTS 0229273 7/1987 European Pat. Off. .

*Primary Examiner*—Richard A. Bertsch
*Assistant Examiner*—Peter G. Korytnyk
*Attorney, Agent, or Firm*—Guido Modiano; Albert Josif

[57] ABSTRACT

Method for manufacturing pumping devices, particularly usable in sports shoes, including the monolithic molding of a body having at least one tubular passage and a first and a second seat for air venting and intake valves. The body furthermore includes at least one chamber with a partially open elastically deformable wall. The method entails the closure of the chamber, whereas the valves and at least one inflatable plenum chamber are associable within the body thus obtained, before closing it. The pumping device thus obtained has optimum functional characteristics as well as very low manufacturing costs.

9 Claims, 3 Drawing Sheets

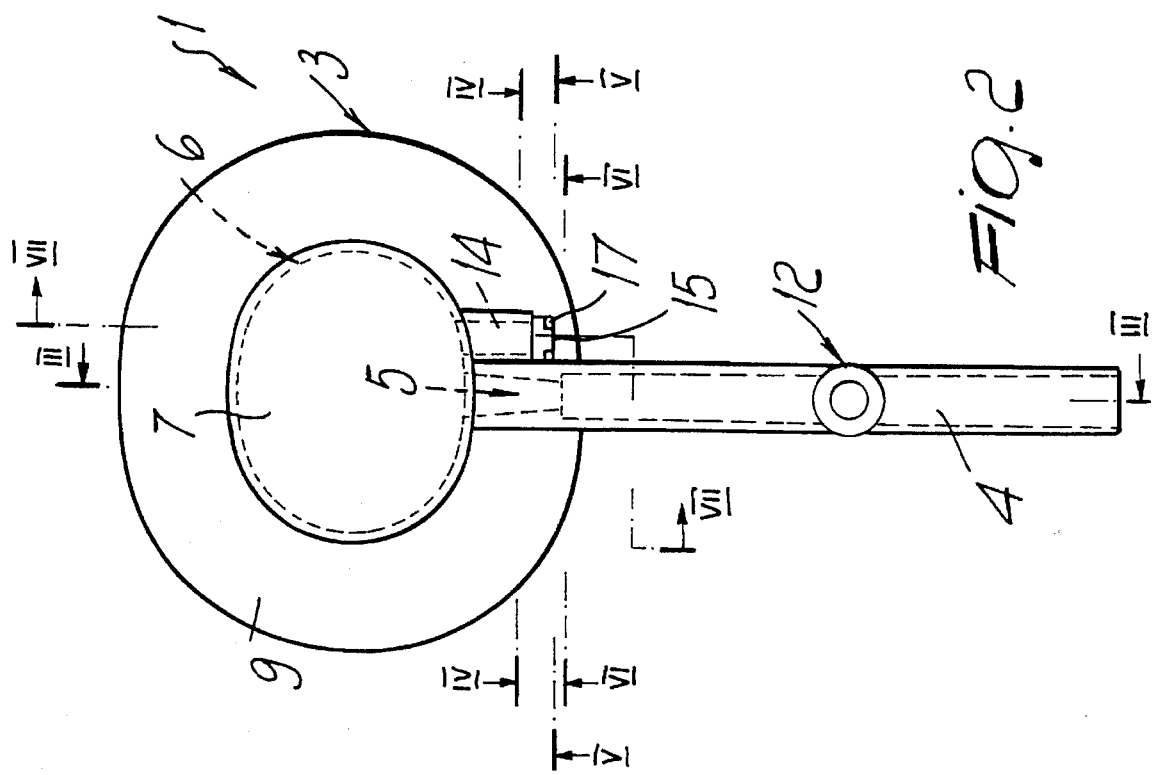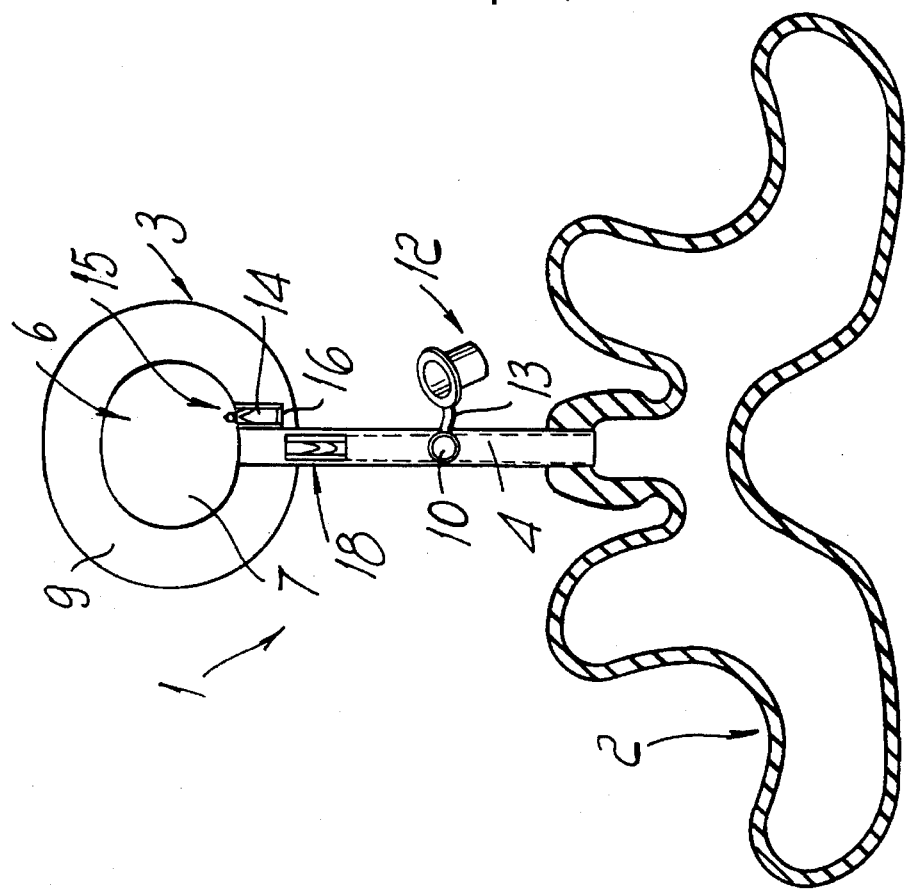

PUMPING DEVICE, PARTICULARLY FOR SPORTS SHOES, AND METHOD FOR MANUFACTURE THEREOF

BACKGROUND OF THE INVENTION

The present invention relates to a pumping device which is particularly usable in sports shoes, such as for example ski boots or skates, and to a method for manufacturing said pumping device.

The use of pumping devices has currently been extended to sports shoes for athletic activities and the like.

Accordingly, the problem regarding the need to achieve optimum fit and securing of the foot inside the shoe by virtue of pneumatic systems is currently strongly felt.

On this subject, U.S. Pat. No. 4,232,459, granted Nov. 11, 1980, discloses a closure device for ski boots that comprises a plenum-chamber element that can be arranged between the shell and the innerboot of the ski boot and is connected to pumping means included in the ski boots; this device has the particularity of connecting the pumping means to the plenum-chamber element by means of an air delivery duct; air venting means, connected to the plenum-chamber element, are also provided.

Although this solution is undoubtedly valid, it has been observed that it has high industrialization costs due to the presence of separate ducts and to the need to apply valves for the operation of the device.

SUMMARY OF THE INVENTION

A principal aim of the present invention is therefore to solve the described technical problems by eliminating the drawbacks of the prior art and thus providing a method that allows to manufacture, with low industrial costs, pumping elements that can be used to improve fit in sports shoes.

Within the scope of the above aim, an important object is to provide a method for manufacturing pumping devices at a low cost.

Another important object is to provide a method for manufacturing pumping devices which are reliable and safe in use.

According to the invention, there is provided a method for manufacturing pumping devices, particularly for sports shoes, which is characterized in that it comprises at least one first step for the monolithic molding of a body that includes at least one tubular passage, a first and a second seat for air venting and intake valves, and at least one chamber with a partially open elastically deformable wall, said method comprising at least one second step for the closure of said at least one chamber, possibly after the placement of one or more of said valves. According to the invention, a pumping device is provided which is characterized in that it is constituted by a body which is formed monolithically and with which said air intake and venting valves and at least one inflatable plenum chamber are associated or associable.

BRIEF DESCRIPTION OF THE DRAWINGS

The characteristics and advantages of the invention will become apparent from the following detailed description of a particular but not exclusive embodiment thereof, illustrated only by way of non-limitative example in the accompanying drawings, wherein:

FIG. 1 is a top view of the pumping device, with an inflatable plenum chamber connected thereto, shown in cross-section;

FIG. 2 is a top view of the pumping device alone;

DESCRIPTION OF THE PREFERRED EMBODIMENTS

Figure 3:
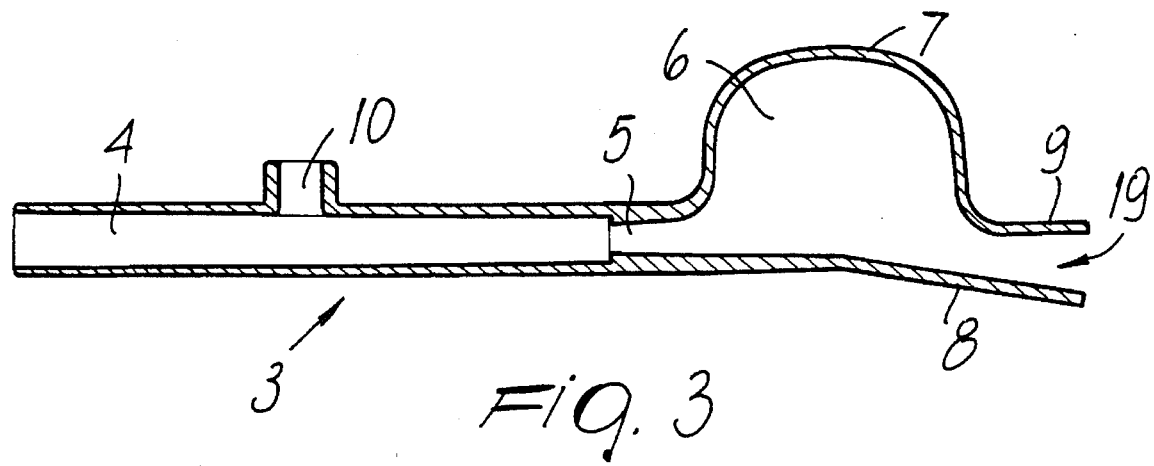
FIG. 3 is a sectional view, taken along the plane III—III of FIG. 2.
Figure 4:
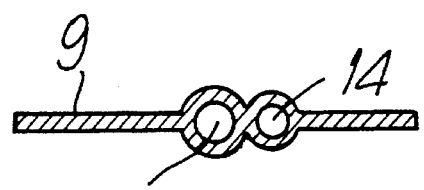
FIG. 4 is a sectional view, taken along the plane IV—IV of FIG. 2.
Figure 5:
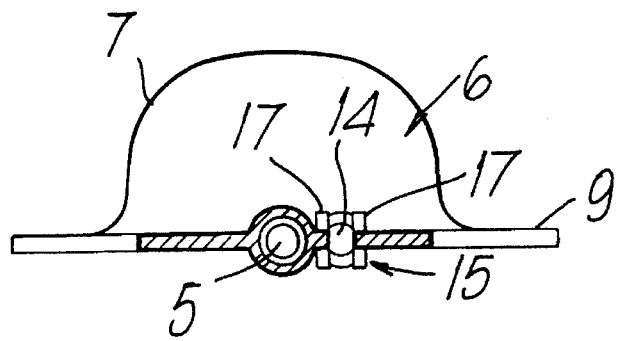
FIG. 5 is a sectional view, taken along the plane V—V of FIG. 2.
Figure 6:
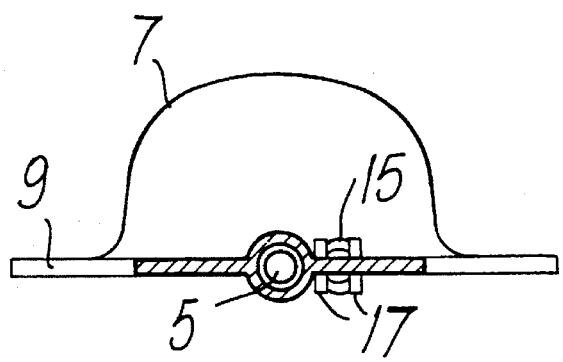
FIG. 6 is a sectional view, taken along the plane VI—VI of FIG. 2.
Figure 7:
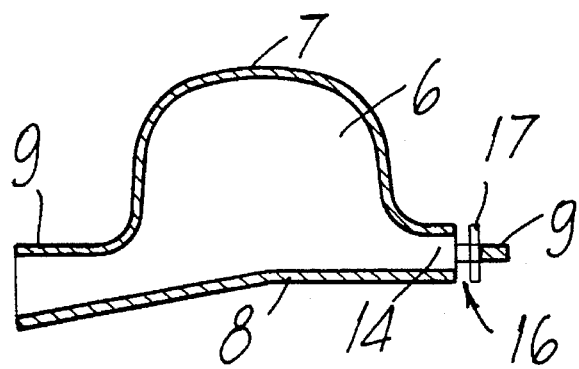
FIG. 7 is a sectional view, taken along the plane VII—VII of FIG. 2.
Figure 8:
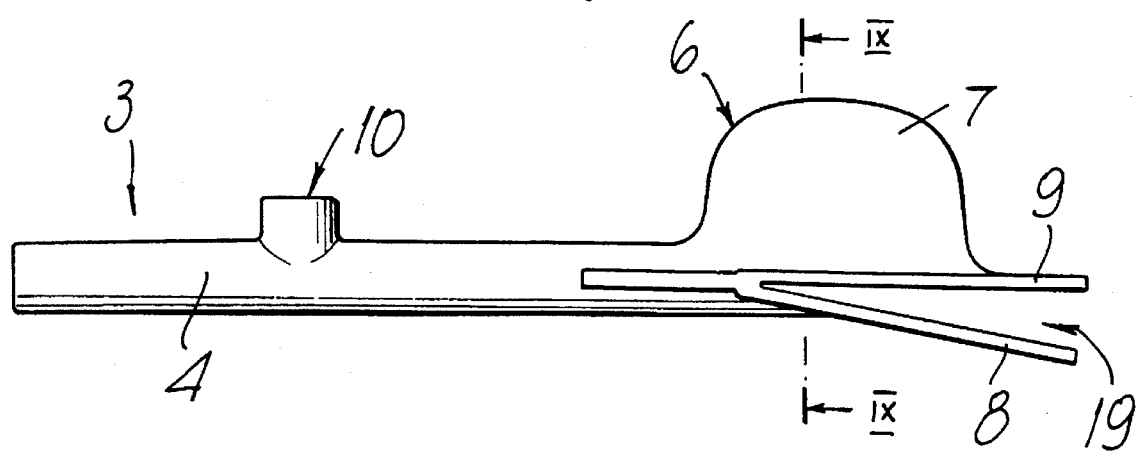
FIG. 8 is a side view of the pumping device obtained after the first molding step.
Figure 9:
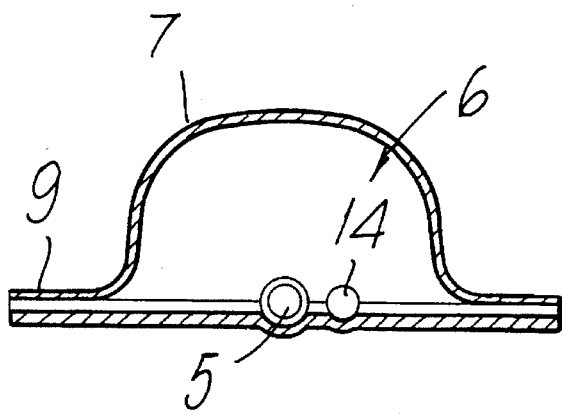
FIG. 9 is a sectional view, taken along the plane IX—IX of FIG. 8.

With reference to the above figures, the reference numeral 1 designates a pumping device that can be used in practice in combination with at least one inflatable plenum chamber 2 in sports shoes, such as shoes for gymnastics, leisure and sports, skates and ski boots.

The pumping device 1 is obtained by means of a method during the first step whereof a body 3, preferably made of elastically deformable plastics, is obtained by monolithic molding.

The body 3 comprises at least one tubular passage 4, preferably constituted by a hollow cylindrical element, which is hermetically connected to the inflatable plenum chamber 2 at one end and, at its other end, by means of a duct 5, to at least one chamber 6 which has at least one elastically deformable wall 7 arranged opposite a bottom 8.

During this first molding step, the chamber 6 is partially open. The bottom 8 is not connected, approximately opposite the tubular passage 4, to a ridge 9 that lies along the perimeter of the chamber 6.

At least one first seat 10 for an air venting valve is provided at the tubular passage 4; said valve can be activated by exerting a pressing or pushing action thereon.

Advantageously, said first seat 10 is radial with respect to the tubular passage 4, and a covering element 12 is connectable to said seat and is constituted by a plug, made of elastically deformable material, which is preferably associated by means of a tongue 13 to the tubular passage 4 outside the seat 10.

A second seat 14 is furthermore formed on the body 3, preferably in a region adjacent to the duct 5, and connects the chamber 6 to the outside; said second seat allows to accommodate a valve 15 for introducing air into said chamber 6.

In order to allow the locking of one end of said valve 15, a recess 16 for the placement of one end of the valve 15 is formed on the ridge 9; said valve 15 is locked in its position by a pair of protrusions 17 that rise at right angles to the ridge 9 at the recess 16 on the opposite side with respect to the second seat 14.

The pumping device furthermore comprises a one-way valve 18 which is accommodated at the duct 5 and allows the air to leave the chamber 6 and enter the tubular passage 4 but not the reverse.

The method can provide, after formation of the body 3, for the insertion of the one-way valve 18 through the opening 19 formed between the ridge 9 and the bottom 8 of said body 3 and for the possible placement of the air intake valve 15.

After this has been accomplished, the method includes a second step during which the opening 19 is closed again, for example by welding or gluing, by mutually joining the ridge 9 and partially the bottom 8, so that the only external connections of the chamber 6 are the one-way valve 18 and the air intake valve 15.

A pumping device is thus obtained in which manufacturing is substantially improved, since the body which includes all the appropriate seats for the valves as well as an air pumping region, constituted by the chamber 6 and by the associated duct, is obtained by monolithic molding; it is therefore sufficient to join the plenum chamber 2 and the valves to said body to obtain the finished part.

Furthermore, obtainment of the body in which the opening 19 is provided allows to facilitate the molding operations, practically eliminating the problems due to the presence of recesses to obtain the valve seats.

It has thus been observed that the invention has achieved the intended aim and objects, a method having been obtained that allows to provide a pumping device that has low manufacturing costs and times, improving industrialization and solving the problems of the prior art, including the need to form recesses for the valve seats.

The invention is naturally susceptible to numerous modifications and variations, all of which are within the scope of the same inventive concept.

The materials and the dimensions that constitute the individual components of the device may naturally also be the most pertinent according to the specific requirements.

What is claimed is:

1. Method for manufacturing a pumping device, for sports shoes, comprising at least one first step of monolithic molding of a body that includes at least one tubular passage, a first seat, and a second seat for air venting and intake valves, and at least one chamber with a partially open elastically deformable wall, said method comprising at least one second step of sealing said at least one chamber, after the placement of one or more of said valves.

2. Method according to claim 1, wherein said pumping device is manufactured by means of a first step in which a body is formed by monolithic molding, said body being preferably made of elastically deformable plastic material and comprising at least one tubular passage, constituted by a hollow cylindrical element, which is hermetically connected to at least one inflatable plenum chamber at one end and is integrally joined, at its other end, by means of at least one duct, to at least one chamber that has at least one elastically deformable wall arranged opposite a bottom, said chamber being partially open, in that said bottom is not connected, approximately opposite said tubular passage, to a ridge which lies along the perimeter of said chamber.

3. Method according to claim 1, wherein at least one first seat for an air venting valve is formed at said tubular passage, and wherein said valve can be activated by a user by exerting a pressing action thereon.

4. Method according to claim 3, wherein said first seat protrudes radially with respect to said tubular passage, a covering element being advantageously associable with said first seat, said covering element being constituted by a plug made of elastically deformable material which is associated, by means of a tongue, with said tubular passage outside said first seat.

5. Method according to claim 1, wherein a second seat is formed on said body, in a region which is adjacent to said duct, and connects said chamber to the outside, said second seat accommodating a valve for introducing air into said chamber.

6. Method according to claim 5, wherein a recess for the placement of an end of said air intake valve is formed on a ridge to allow the locking of one end of said valve, which is locked in its position by a pair of protrusions that rise at right angles with respect to said ridge at said recess opposite said second seat.

7. Method according to claim 1, wherein said pumping device furthermore comprises a one-way valve which can be accommodated at said duct and is suitable to allow air to flow from said chamber to said tubular passage but not from said tubular passage to said chamber.

8. Method according to claim 1, wherein after formation of said body, the insertion of a one-way valve through a opening formed between a ridge and a bottom of said body.

9. Method according to claim 8, wherein a second step during which said opening is closed by hermetically joining together said ridge and partially said bottom, so as to cause said chamber to have said one-way valve and said air intake valve as its only external connections.

* * * * *